S. Blue,
Cook Stove.
No. 111,427.  Patented Jan. 31, 1871.

Witnesses.
Chas Kempor
Villate Anderson

Inventor.
Samuel Blue,
Chipman, Hosmer & Co
Attys,

United States Patent Office.

SAMUEL BLUE, OF DANVILLE, PENNSYLVANIA.

Letters Patent No. 111,427, dated January 31, 1871.

IMPROVEMENT IN COOKING-STOVES.

The Schedule referred to in these Letters Patent and making part of the same.

To all whom it may concern:

Be it known that I, SAMUEL BLUE, of Danville borough, in the county of Montour and State of Pennsylvania, have invented a new and valuable Improvement in Stoves; and I do hereby declare that the following is a full, clear, and exact description of the construction and operation of the same, reference being had to the annexed drawing making a part of this specification, and to the letters and figures of reference marked thereon.

Figure 1 of the drawing is a perspective view of an ordinary three-flue stove.

Figure 1:
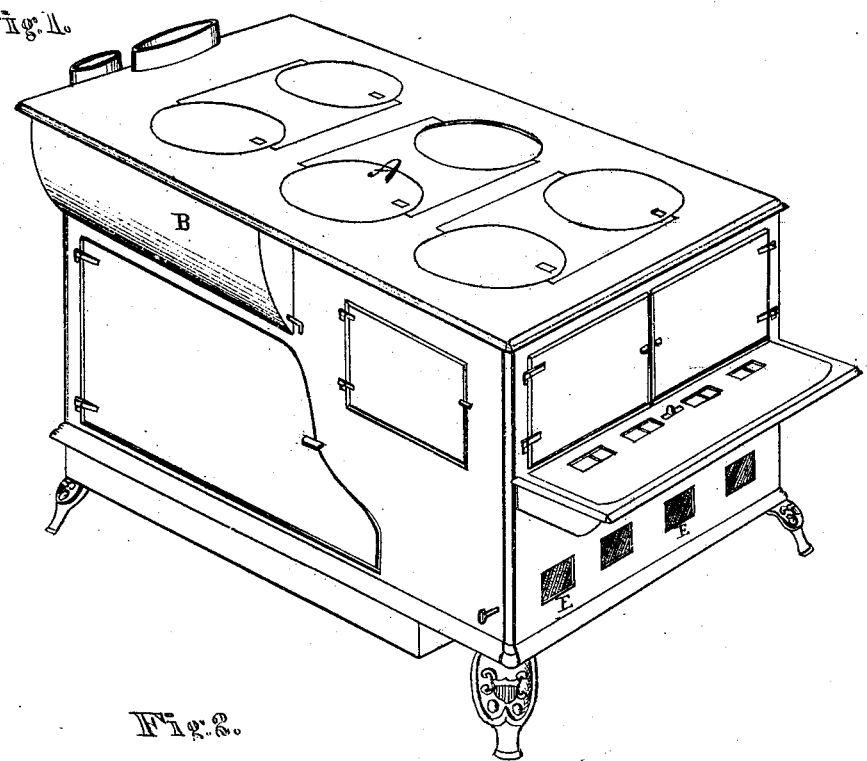
Figure 2:
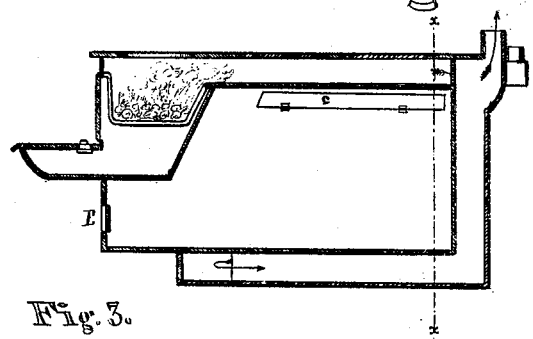
Figure 2 is a central vertical longitudinal section of the same.
Figure 3:
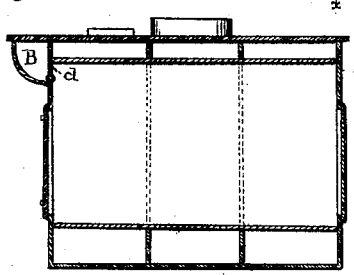
Figure 3 is a vertical transverse section through the line $x\,x$.

My invention has relation to an improvement in the ordinary three-flue cooking-stove having an air-inlet into the oven; and It consists in making an opening in the side wall of the oven over the oven-door and attaching a pipe or flue thereto for the purpose of conveying hot air from the oven to such compartment or place as may be desired.

Heretofore, in taking the heated air from a draught-oven in a three-flue cooking-stove, the pipe has been passed from the oven-wall through the flue to the exterior wall of the stove, and thence wherever might be desired. In the three-flue cooking-stove all of the space above the oven, in rear of it, and below it, is occupied by the flues for the conveyance of the heated products of combustion. Sometimes the pipe has been carried through the upper horizontal flue out at the top of the stove; sometimes through a vertical flue out at the rear end of the stove.

All obstructions in the flues of a stove of this character are injurious to the draught. So important is this fact that even where the flues are not clean such a stove will smoke.

The object of my invention is to provide an outlet for the hot air from the oven without interfering with the flues in the slightest particular.

The letter A of the drawing represents an ordinary three-flue cooking-stove, with inlet-openings E to the oven. These openings are designed to be closed, when the oven is used for cooking purposes, by a suitable slide or other device.

B represents my hot-air flue arranged over the oven-door on the outside of the stove, and communicating with the oven through the opening $c$ in the side wall of the oven, which is also the wall of the stove. This opening is situated just over the oven-door and beneath the top wall or upper plate of the oven.

When the oven is in use for cooking purposes the opening $c$ is closed by a suitable damper, $d$.

It is apparent that my hot-air flue cannot interfere in the slightest degree with the internal flues of the stove. It is entirely separate from them, and communicates solely with the oven or hot-air chamber.

What I claim as my invention, and desire to secure by Letters Patent, is—

The independent flue B communicating with the draught-oven of a three-flue cooking-stove through an opening, $c$, in the lateral wall of the oven over the oven-door, substantially as specified.

In testimony that I claim the above I have hereunto subscribed my name in the presence of two witnesses.

SAML. BLUE.

Witnesses:
HICKMAN FRAME,
GEO. D. BUTLER.